United States Patent
Stark

(10) Patent No.: US 8,425,779 B2
(45) Date of Patent: Apr. 23, 2013

(54) METHOD FOR CONVERTING A FLUCTUATING AND/OR ERRATIC ENERGY SUPPLY INTO A STABLE ENERGY SOURCE

(75) Inventor: John Stark, Wattenwil (CH)

(73) Assignee: DCT Double-Cone Technology AG, Thun (CH)

( * ) Notice: Subject to any disclaimer, the term of this patent is extended or adjusted under 35 U.S.C. 154(b) by 694 days.

(21) Appl. No.: 12/449,949

(22) PCT Filed: Mar. 6, 2007

(86) PCT No.: PCT/CH2007/000121
§ 371 (c)(1),
(2), (4) Date: Jan. 11, 2010

(87) PCT Pub. No.: WO2008/106808
PCT Pub. Date: Sep. 12, 2008

(65) Prior Publication Data
US 2010/0126160 A1    May 27, 2010

(51) Int. Cl.
*C02F 1/44*    (2006.01)
*B01D 24/00*    (2006.01)

(52) U.S. Cl.
USPC ........... 210/637; 210/767; 210/90; 210/101; 210/137; 210/188; 210/258; 210/416.1

(58) Field of Classification Search ............ 210/151, 210/188, 221.2, 321.66
See application file for complete search history.

(56) References Cited

U.S. PATENT DOCUMENTS

| | | | |
|---|---|---|---|
| 4,792,284 A | 12/1988 | Straub et al. | |
| 2003/0006189 A1* | 1/2003 | Verstraete et al. | 210/617 |

FOREIGN PATENT DOCUMENTS

| | | | |
|---|---|---|---|
| CH | 669 823 A5 | 4/1989 | |
| CN | 1504705 A | 6/2004 | |
| WO | WO 87/01770 A | 3/1987 | |
| WO | WO 01/16493 A1 | 3/2001 | |
| WO | WO 2004/113733 A | 12/2004 | |
| WO | WO 2005/007579 A | 1/2005 | |
| WO | WO 2005007579 A1 * | 1/2005 | |

OTHER PUBLICATIONS

English translation of the First Office Action (10 pages) from corresponding Chinese Patent Application 200780052000.4, dated Apr. 20, 2011.

* cited by examiner

*Primary Examiner* — Krishnan S Menon
*Assistant Examiner* — Allison M Gionta
(74) *Attorney, Agent, or Firm* — Pauley Petersen & Erickson

(57) ABSTRACT

In a method for converting fluctuating energy into a stable energy supply, the fluctuating energy is derived from the group of solar energy, wind power, waves or water currents, this energy being delivered to a first pump being integrated in a pressure circuit for delivering stable energy and the pressure circuit comprising a pressure amplifier with a double-cone device being driven by the liquid flow circulated by the first pump. This allows the stabilization of fluctuating energy to be used e.g. in desalination plants without supplemental storage energy and without reverting to electric current conversion.

3 Claims, 3 Drawing Sheets

METHOD FOR CONVERTING A FLUCTUATING AND/OR ERRATIC ENERGY SUPPLY INTO A STABLE ENERGY SOURCE

BACKGROUND OF THE INVENTION

1. Field of the Invention

The present invention refers to a method for converting a fluctuating and/or erratic energy supply into a stable energy source, according to the introduction of claim 1.

2. Discussion of Related Art

Many renewable energy sources manifest both a fluctuating and an erratic energy output. In particular, solar energy, wind power, waves and water currents are dependent both on largely unpredictable climatic conditions and on predictable temporal cycles. The net result is generally a semi-unreliable power Output that does not facilitate and favour its use for many simple applications. In fact, the growth of wind turbine farms is currently limited by the fact that there is an upper limit of some 20% for their power contribution to conventional electrical grids. Beyond this value the grids become seriously disrupted.

SUMMARY OF THE INVENTION

Departing from this prior art, it is an object of the present invention to propose a method of energy storage without the need for electrical conversion.

This object is attained by means of the method of claim 1. Further advantages and preferred embodiments are defined in the dependent claims.

BRIEF DESCRIPTION OF THE DRAWINGS

The invention will be explained in more detail hereinafter with reference to the flow diagram drawings of exemplary embodiments.

DETAILED DESCRIPTION OF THE EMBODIMENTS

Figure 1:
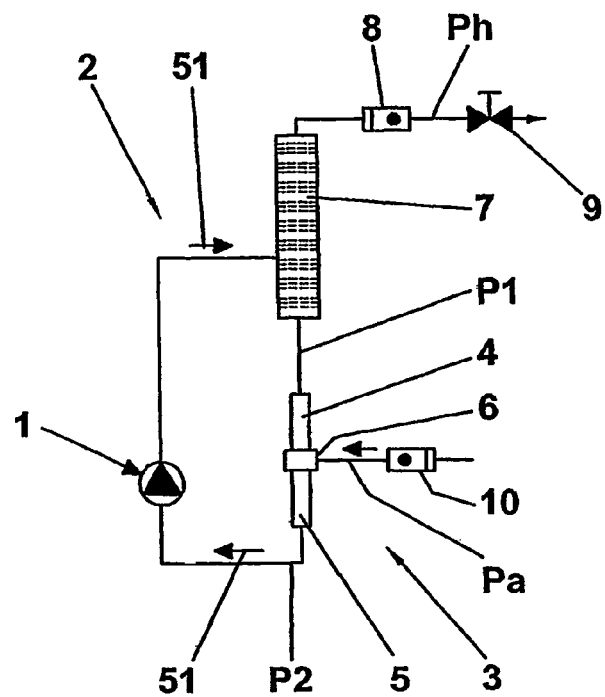
FIG. 1 shows a first embodiment of a low-pressure liquid feed converter into a high-pressure supply.

As mentioned in the introduction, the subject of this invention is the conversion of the erratic and variable energy output of typical renewable energy sources into a stable controllable power supply. According to the invention this can be achieved without the requirement of passing by the electricity production stage (voltaic cells excluded). In all cases the converting and stabilising of any electrical outputs is avoided. Once stable and controllable, the energy may be dosed in a continuous manner so as to permit the economic use of standard equipment. The conversion technique also lends itself to the direct pumping of liquids, gases and the purification of contaminated water.

In general, there exist a number of solutions for converting renewable energy sources such as wind, solar, waves and water currents into electrical and/or mechanical outputs. According to the flow diagram of FIG. 1, this power is supplied to an unsophisticated circulation pump. This pump is integrated into a pressure circuit that includes a pressure amplifier, which comprises components which are known under the name of DCT (Double-cone Technology) and described inter alia in WO-A-2004/113733 and WO-A-2001/16493, both to the applicant of the present patent. Both applications are, insofar as the double-cone technology, resp. pressure amplifier, is concerned, incorporated as part of the present disclosure. Hereinafter, some examples of methods for storing energy are given.

Generally, a double-cone device (DCD) or DCT pressure amplifier comprises two frustroconical sections interconnected by their narrow ends to create an orifice. The entry section provides the entry for the working fluid, the exit section the exit for the mixture of working fluid and sucked-in fluid. At the orifice or in the exit cone, a gap and/or permeable zone constitute the inlet for fluid to be sucked-in. More specifically, conicities of the conical sections, width of orifice etc. are to comply with conditions laid down in the above-mentioned publications in order that a DCD in the strict sense is present.

Water Storage

Circulation pump 1 is integrated into a pressure circuit 2 and starts up under low load. Fresh or contaminated water, for example salt-water, is fed at low pressure into the pressure circuit through a pressure amplifier 3 comprising the above-mentioned double-cone with an entry cone 4, an exit cone 5 and a gap chamber with entrance 6. The energy for it is taken from the flow of liquid (arrows 51). This results in three different pressures $P_3$, Pi, P2 as a function of the pumping power available from the circulation pump 1, whereby $P_a < P_2 < Pi$.

The circulation pump 1 can be driven by various unstable energy supplies such as wind, sun, water current or waves. Progressively, the circuit pressure builds up without substantially increasing the power requirement of the circulation pump. The water is stored in an elevated storage site 7 and, once the pressure attains a sufficient level, the water is metered out at high pressure through a nonreturn valve 8 and a pressure regulation valve 9. The pressure $P_h$ is much higher than that of the circulation pump delivery pressure (P1-P2) ●
As the power input fluctuates, the circuit pressure automatically rises or falls. With a pressure fall, the non-return valves 8 and 10 at the entry shut off the inlet and outlet to the circuit so that the residual circuit pressure is not lost.

Normally, on closing the inlet and/or outlet to a pump the action leads to very rapid pump breakdown. In the present circuit, no such situation occurs and all functions remain in a totally safe manner. For the case of surge in the power supply, a larger output is achieved and under extreme circumstances, the circuit pressure will ceiling automatically as dictated by the fluid dynamic behaviour of the static pressure amplifier device 3. The system is totally self-regulating and does not require any electronics other than that which is dedicated to the specific renewable energy source.

Compressed Air Storage

Figure 2:
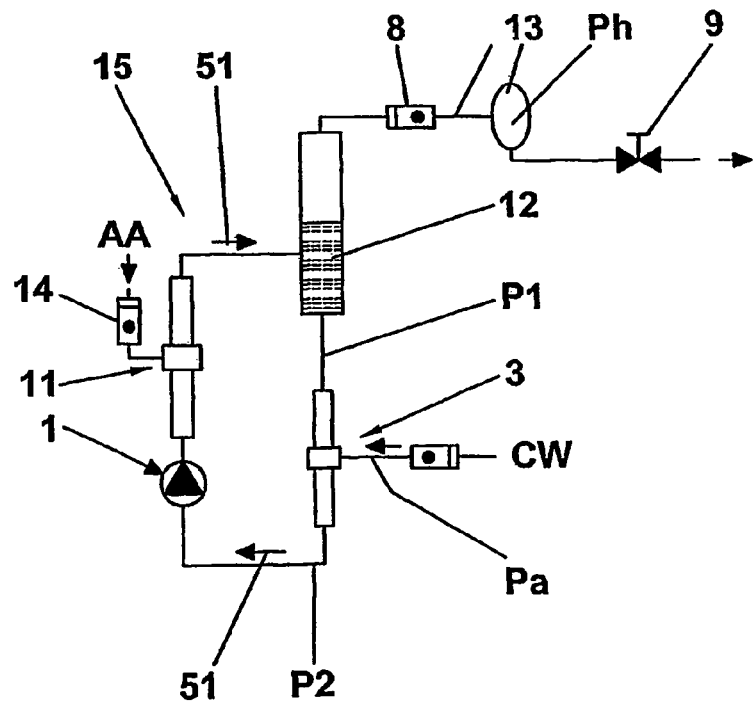
FIG. 2 shows the converter of FIG. 1 for a high-pressure compressed air supply.

According to FIG. 2 atmospheric air may be compressed using a similar circuit as shown in FIG. 1. In this circuit 15, an extension of the first one, a second pressure amplifier 11 is incorporated for drawing in the atmospheric air AA, the other, 3, having the same function as in the first example, for maintaining the circulating water volume CW. The supply of water is as a rule kept at a low volume by a flow control means, in the simplest case a valve (not shown).

The gas is separated from the water in the separator 12 and then passed to a compressed air storage vessel 13 through non-return valve 8. This compressed air can then be metered out through valve 9 for whatever end application it is required.

In the event of severe fluctuations, the non-return valves 8, 10 and additionally 14 prevent loss of water and residual pressure from the system.

Desalinating Water Using a Fluctuating Power Source

Figure 3:
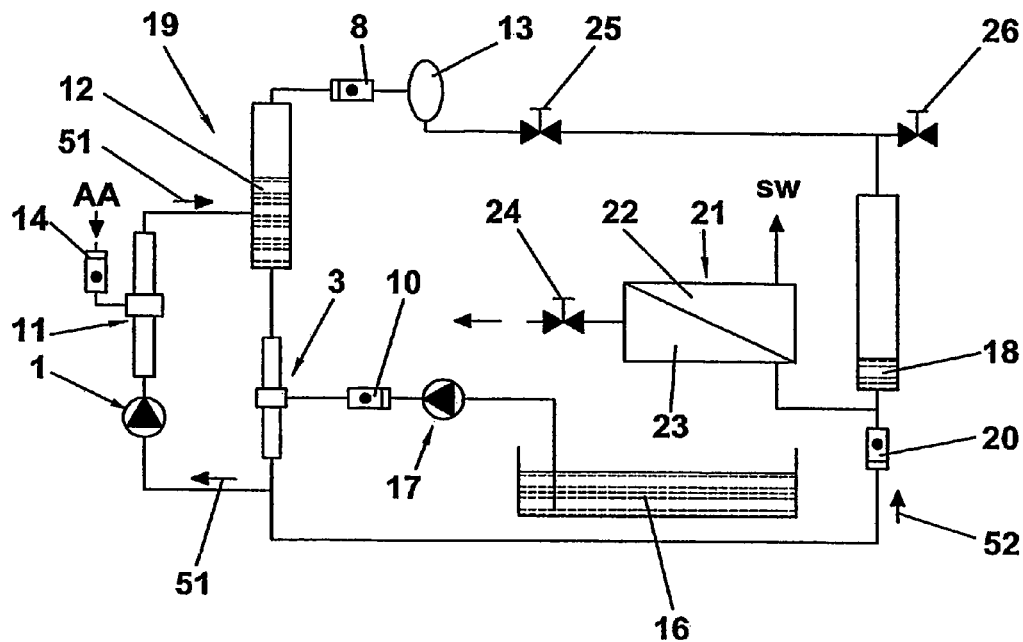
FIG. 3 shows the converter of FIG. 2 in a sweet water storage filling mode.
Figure 4:
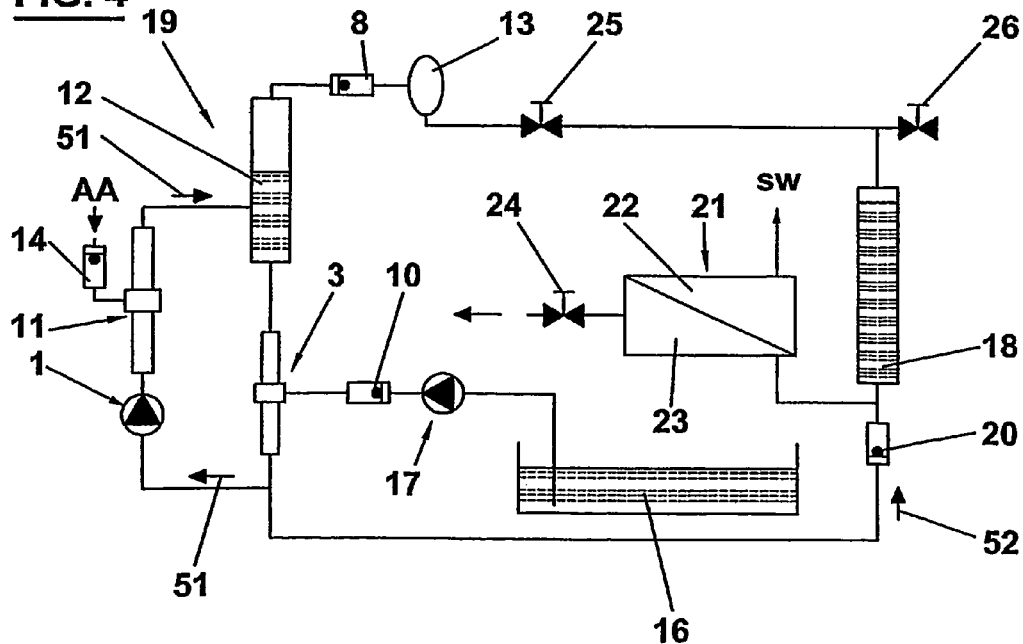
FIG. 4 shows the converter of FIG. 2 in a sweet water production mode.
Figure 5:
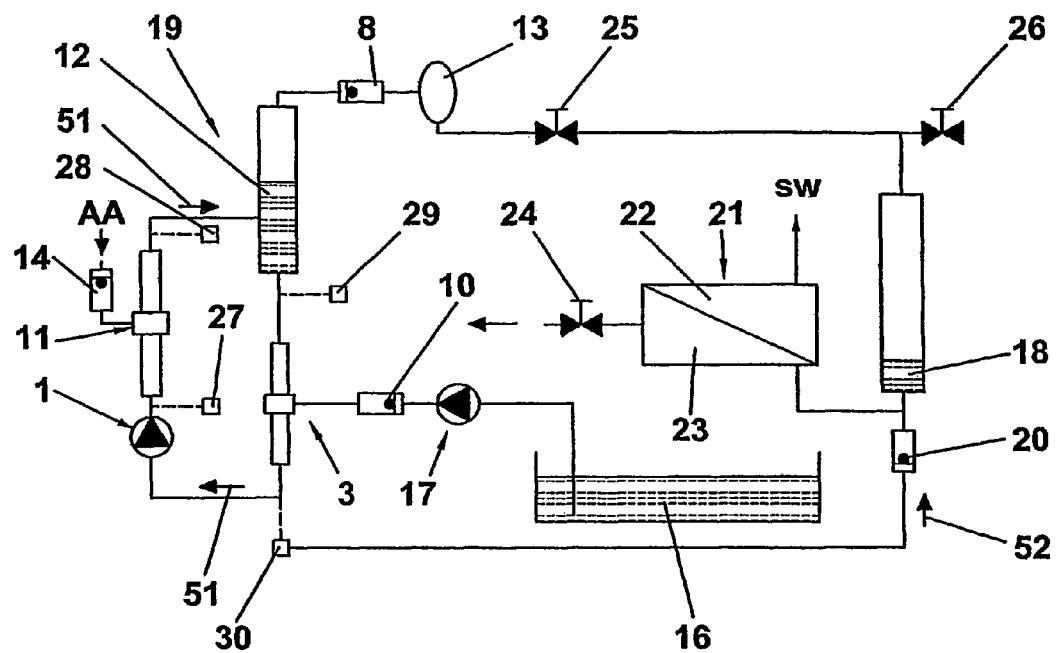
FIG. 5 shows a variation of the converter of FIG. 4.

The desalination of salt water becomes extremely inefficient and unreliable when using the technique of reverse osmosis (RO) if the feed pressure to the membranes fluctuates. Utilising the compressed air storage technique according to FIG. 2, an integrated desalination system may be designed as shown in FIGS. 3-5. FIG. 3 demonstrates the filling mode where a large volume of seawater is brought under pressure simultaneously with the build-up of a compressed air supply. In FIG. 4, the water production mode becomes operative, and in FIG. 5 additional possibilities are shown.

According to FIG. 3, whilst power is available to circulation pump 1, pressure will build up in the compressed air storage vessel 13 and at the same time salt water drawn from the source 16 will be deposited in the salt water storage tank 18 (arrow 52). The pressure regulating valves 24 and 25 are closed and 26 is open, whereas the non-return valves 8, 10, 14, and 20 are open. Regulating valve 25, however, remains closed until the predetermined working conditions are attained, e.g. pressure in storage vessel 13 or salt water level in storage tank 18.

When the power drops, as depicted in FIG. 4, the residual pressure within the pressure circuit 19 will close off the non-return valves 10 and 14, the pressure in storage vessel 13 causes valves 8 and 20 to close as well, the pressure regulating valves 24 and 25 are open whereas valve 26 is closed. This leaves the compressed air in storage vessel 13 to drive the salt water out of the storage tank 18 and through the reverse osmosis membranes 21, so producing sweet water 22 and brine 23.

As long as power is available, pressurizing loop 19 will continue to supply pressurized air to storage vessel 13 and/or salt water to salt-water tank 18 through the nonreturn valves 8 resp. 20 depending on the pressure conditions in separator 12 resp. the pressure of the circulating water having passed pressure amplifier 3.

In FIG. 5 several possible alternate outlets 27, 28, 29, and 30 are shown for filling the salt-water storage tank 18.

Rather than allow too many cycle changes between filling and water production, a simple electrical and/or mechanical control system can be added, based on the level of stored water in the storage tank. During periods of maintained power input the arrangement depicted in FIG. 4 will produce sweet water continuously.

From the preceeding description, the one skilled in the art can derive many alterations and modifications of the invention without leaving its scope which is solely defined by the attached claims. Some conceivable modifications are:

Use of another fluid other than water as the working fluid like gases.

The exits of the storage tank, e.g. of storage site 7, may be arranged at another location instead of the top, particularly at its bottom.

The invention claimed is:

1. A method for converting fluctuating and/or erratic energy into a stable energy supply, wherein the fluctuating energy is produced by at least one of solar energy, wind power, waves and water currents, the method comprising:
    delivering the energy to a first pump integrated in a pressure circuit for delivering stable energy, the pressure circuit comprising a first pressure amplifier with a double-cone device (DCD) driven by a first fluid flow circulated by the first pump,
    inserting a second fluid into the pressure circuit with the DCD to elevate the pressure in the pressure circuit,
    collecting the first fluid in a storage site having a high-pressure outlet for delivering a continuous high-pressure fluid flow through the high-pressure outlet,
    feeding an outlet stream of the first fluid of the first pump into a second pressure amplifier, the second pressure amplifier sucking in a gas through its inlet,
    feeding the outgoing pressurized first fluid with gas into a liquid-air separator for separating the gas from the first fluid, and
    collecting the compressed gas in a compressed air vessel connected to the separator to produce in parallel to high-pressure fluid a continuous high-pressure air supply.

2. The method of claim 1, further comprising, in a first step:
    feeding salt water as the second fluid into the first pressure amplifier through its inlet and then into a saltwater-storage tank connected to the pressure circuit, and in a second step,
    feeding, with air as the gas, the compressed air to the salt-water storage tank for pressing the stored saltwater through a reverse osmosis device for obtaining sweet water.

3. The method of claim 1 wherein the first and second fluids are one of a liquid, water, or a mixture thereof, or a dispersion or solution with one of these fluids as the dispersant resp. solvent.

* * * * *